(12) United States Patent
Himmelstoss et al.

(10) Patent No.: US 8,860,606 B2
(45) Date of Patent: Oct. 14, 2014

(54) RADAR SENSOR HAVING INTERFERENCE SIGNAL COMPENSATION

(75) Inventors: Armin Himmelstoss, Weissach lm Tal (DE); Michael Klar, Magstadt (DE); Johann-Peter Forstner, Steinhoering (DE); Thomas Binzer, Ingersheim (DE); Thomas Walter, Renningen (DE); Klaus-Dieter Miosga, Backnang (DE); Oliver Brueggemann, Oelbronn-Duerrn (DE); Alexander Fischer, Linz (AT); Joachim Hauk, Renningen-Malmsheim (DE); Elisabeth Hauk, legal representative, Renningen-Malmsheim (DE); Rahel Hauk, legal representative, Renningen-Malsheim (DE); Manuel Hauk, legal representative, Renningen-Malsheim (DE); Dirk Steinbuch, Wimsheim (DE); Herbert Jaeger, Linz (AT); Erich Kolmhofer, Linz (AT); Juergen Seiz, Welzheim (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 13/259,463

(22) PCT Filed: Apr. 19, 2010

(86) PCT No.: PCT/EP2010/055083
§ 371 (c)(1),
(2), (4) Date: Jun. 4, 2012

(87) PCT Pub. No.: WO2010/149405
PCT Pub. Date: Dec. 29, 2010

(65) Prior Publication Data
US 2012/0326919 A1    Dec. 27, 2012

(30) Foreign Application Priority Data
Jun. 5, 2009 (DE) .......................... 10 2009 026 767

(51) Int. Cl.
G01S 13/00 (2006.01)
G01S 7/03 (2006.01)
G01S 13/93 (2006.01)

(52) U.S. Cl.
CPC ............... G01S 7/032 (2013.01); G01S 13/931 (2013.01); G01S 7/036 (2013.01); G01S 7/038 (2013.01)
USPC .......................... 342/159; 342/175; 342/189

(58) Field of Classification Search
CPC ......... G01S 7/03; G01S 13/931; G01S 7/032; H01P 1/38; H01Q 13/24
USPC .................. 342/159–164, 175, 198
See application file for complete search history.

(56) References Cited

U.S. PATENT DOCUMENTS 3,339,197 A * 8/1967 Tate .............................. 342/202
4,492,960 A * 1/1985 Hislop .......................... 342/175

(Continued)

FOREIGN PATENT DOCUMENTS

DE           199 58 206           7/2001
DE        10 2005 008 733        10/2005

(Continued)

OTHER PUBLICATIONS

International Search Report, PCT International Application No. PCT/EP2010/055083, dated Jul. 26, 2010.

Primary Examiner — Peter Bythrow
(74) Attorney, Agent, or Firm — Kenyon & Kenyon LLP

(57) ABSTRACT

Radar sensor having a mixer for mixing a received signal with a reference signal and having a device for compensating interference signals which would overload the mixer, wherein the device for compensating the interference signals has an adjustable reflection point at the reference input of the mixer.

10 Claims, 2 Drawing Sheets

(56) References Cited

U.S. PATENT DOCUMENTS

| | | | |
|---|---|---|---|
| 4,961,074 A * | 10/1990 | Martinson | 342/20 |
| 5,396,433 A * | 3/1995 | Kosugi | 700/109 |
| 6,008,750 A * | 12/1999 | Cottle et al. | 342/42 |
| 6,686,867 B1 * | 2/2004 | Lissel et al. | 342/70 |
| 6,690,210 B2 * | 2/2004 | Hadjizada et al. | 327/105 |
| 7,573,420 B2 * | 8/2009 | Forstner et al. | 342/175 |
| 7,602,333 B2 * | 10/2009 | Hiramatsu et al. | 342/175 |
| 8,482,454 B2 * | 7/2013 | Binzer et al. | 342/70 |
| 2005/0088336 A1 * | 4/2005 | Sakamoto et al. | 342/175 |
| 2005/0190101 A1 * | 9/2005 | Hiramatsu et al. | 342/175 |
| 2006/0214842 A1 * | 9/2006 | Takenoshita et al. | 342/175 |
| 2008/0287085 A1 * | 11/2008 | Forstner et al. | 455/293 |
| 2009/0189801 A1 * | 7/2009 | Forstner et al. | 342/175 |
| 2011/0095937 A1 * | 4/2011 | Klar et al. | 342/70 |

FOREIGN PATENT DOCUMENTS

| | | |
|---|---|---|
| DE | 102005030345 | 3/2006 |
| EP | 0622840 | 11/1994 |
| JP | 2005-311970 | 11/2005 |
| JP | 2006-50581 | 2/2006 |

* cited by examiner

8,860,606 B2

RADAR SENSOR HAVING INTERFERENCE SIGNAL COMPENSATION

FIELD OF THE INVENTION

The present invention relates to a radar sensor having a mixer for mixing a received signal with a reference signal and having a device for compensation of interference signals which would overdrive the mixer.

BACKGROUND INFORMATION

Radar sensors are used, for example, as distance sensors in motor vehicles. The first implementations made use of discrete semiconductor components to generate high frequency at 77 GHz and convert it into analyzable signals. So-called MMICs (microwave monolithic integrated circuits) have been accepted for several years. They are characterized in that HF circuits are integrated into a chip in a space-saving manner.

SiGe (silicon germanium) is available as an HF semiconductor material as a novel technology platform, which has in the meantime been qualified for automotive use and offers the potential of high integration of HF circuit technology. In particular it is reasonable here for the first time to use active mixers instead of implementing passive mixtures in the form of discrete diodes or diodes integrated into an MMIC, as has been customary in the past.

Whereas passive mixers have a conversion loss, active mixers have a conversion gain due to their gain. Active mixers are therefore more susceptible to overdriving at high input signals, which causes a severe impairment of mixer efficiency. This is counteracted by designing the mixer cells to have greater high-signal resistance with respect to major signals through special circuit technology, but this increases the power consumption. Nevertheless the case occurs that at strong and near reflections, the transmission power is reflected back into the reception path with only slight damping and brings the receiver to saturation due to the high absolute power.

Since this effect typically occurs at short distances at stationary reflection points, transmission and reception signals have practically no frequency shift, which yields a direct voltage, hereinafter referred to as "DC offset" as the mixed product. Although this DC voltage may be eliminated by alternating voltage coupling at the mixer output, it nevertheless results in overdriving and impaired efficiency in the mixer cell itself.

In particular in the case of compact radar systems using a shared antenna for the transmission and reception cases and having a shared transmission and reception path (monostatic radar), these reflections are particularly pronounced and are responsible for a greatly restricted efficiency in the use of a non-optimal layout.

With today's automotive radars, there is therefore increasing use of bistatic radar architectures, preventing direct back-reflection within the shared transmission and reception path. Here again, however, the problems are not completely eliminated in the case of near and strong reflections, for example, due to installation of the radar behind reflective bumpers. Furthermore, it is a disadvantage to double the antenna area through the bistatic design in particular in the case of strongly bundling antennas having a large aperture.

In addition, the problem may be reduced by using a lower transmission power. However, a lower transmission power is associated with a lower range, which is also undesirable.

Active offset regulations in communication systems prevent overdriving through feedback. However, this has been implemented so far only at significantly lower frequencies and has not been implemented economically at 77 GHz.

A send/receive switch may be situated in front of the antenna. However, this technology has so far also been reserved for much lower frequencies and furthermore causes an increased complexity, which is unacceptable in a radar sensor which is to be manufactured economically for motor vehicles.

SUMMARY

An object of the present invention is to create a radar sensor for motor vehicles in particular, in which interference signals resulting in saturation of the mixer may be suppressed easily and effectively.

This object may be achieved according to an example embodiment of the present invention by the fact that the device for interference signal compensation has an adjustable reflection point at the reference input of the mixer.

The example embodiment of the present invention makes use of the fact that various types of reflection occur in a mixer of a radar sensor and in its environment, and the signals based on these different types of reflection interfere with one another on the mixer. With the help of the adjustable reflection point, the phase and amplitude of at least one of these signals may now be adjusted in such a way that destructive interference occurs and the resulting interference signal is therefore suppressed.

BRIEF DESCRIPTION OF THE DRAWINGS

One exemplary embodiment of the present invention is illustrated in the figures and explained in greater detail below.

DETAILED DESCRIPTION OF EXAMPLE EMBODIMENTS

Figure 1:
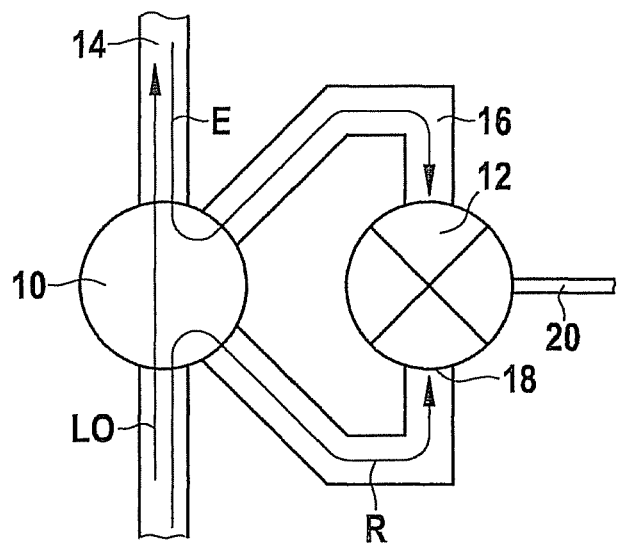
FIG. 1 shows a basic diagram of a mixer module of a radar sensor.

FIG. 1 shows as a basic diagram a mixer module of a monostatic radar sensor for motor vehicles, for example, of a 77 GHz radar. Main function components of the mixer module include a coupler 10 and actual mixer cell 12. The functions of these two components may also be combined in a single component, for example, in a transfer mixer, but this is not of further importance for the principles to be explained here. Coupler 10 is connected to a high-frequency line 14, which leads from a local oscillator (not shown) to an antenna (also not shown) of the radar system.

A transmission signal LO (77 GHz high-frequency signal) generated by the local oscillator is transmitted to the antenna via high-frequency line 14 and then emitted by this antenna. The signal reflected on an object to be located is received again by the same antenna and transmitted back to coupler 10 as received signal E over high-frequency line 14. This received signal E is decoupled from high-frequency line 14 by coupler 10 and sent to an HF input 16 of this mixer cell 12. Additionally, a portion of transmission signal LO is decoupled by coupler 10 and sent as reference signal R to a reference input 18 of mixer cell 12. Received signal E and reference signal R are mixed together in mixer cell 12, yielding an intermediate frequency signal whose frequency corresponds to the frequency difference between received signal E and reference signal R. This intermediate frequency signal is picked up at an IF output 20 of the mixer and sent for further analysis.

Figure 2:
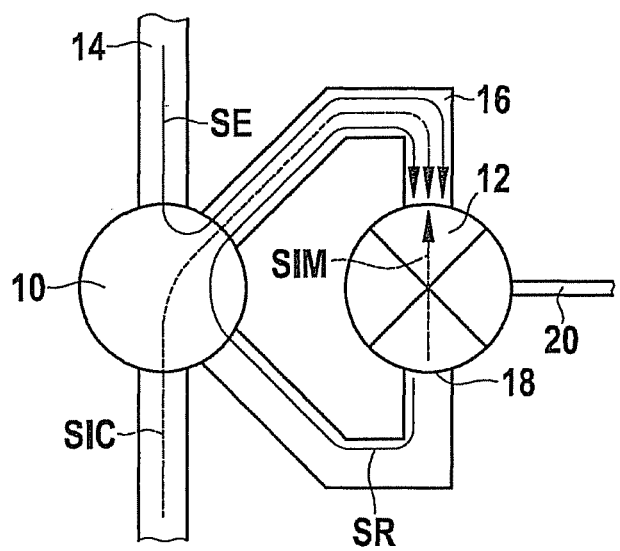
FIG. 2 shows a schematic diagram of various types of reflection occurring in the mixer module according to FIG. 1.

FIG. 2 shows a basic diagram of the same mixer module as in FIG. 1, showing various interference signals, which are formed due to different types of reflection in the mixer module itself and/or in its environment, instead of signals LO, E, and R described above. As an example, it may be assumed that the mixer module is formed by an MMIC. In this case, one may differentiate between internal reflections within the MMIC and reflections caused by installation of the MMIC in its environment.

An installation-induced interference signal SE, which is caused by reflection points in or on the antenna-end branch of high-frequency line 14 and/or by the HF transition between this branch of the high-frequency line and the MMIC, occurs in this latter manner. The HF transition may be embodied as a bond transition or as a flip chip. Reception-induced interference signal SE goes to HF input 16 of the mixer cell via coupler 10.

An internal interference signal SR is generated by reflection on reference input 18 of mixer cell 12 and also goes to HF input 16 of the mixer cell via coupler 10.

Additional interference signals SIC and SIM, although they are less important in practice, occur due to incomplete insulation of coupler 10 or incomplete insulation between the reference input and the HF input of mixer cell 12.

All these interference signals are superimposed vectorally on one another at the HF input of mixer cell 12 and thus result in interference.

Internal interference signals SR, SIC, and SIM are controllable in principle through suitable design of the MMIC, which forms the mixer module. However this is not true of external interference signal SE, which depends on the specific installation conditions of the mixer module in the overall system of the radar sensor.

Therefore after installation of the MMICs in the radar sensor, it may be found from one case to the next that the interference signals at HF input 16 of mixer cell 12 mainly cause constructive interference, reaching an amplitude which causes saturation of the mixer cell and thus greatly impairs mixer efficiency.

Figure 3:
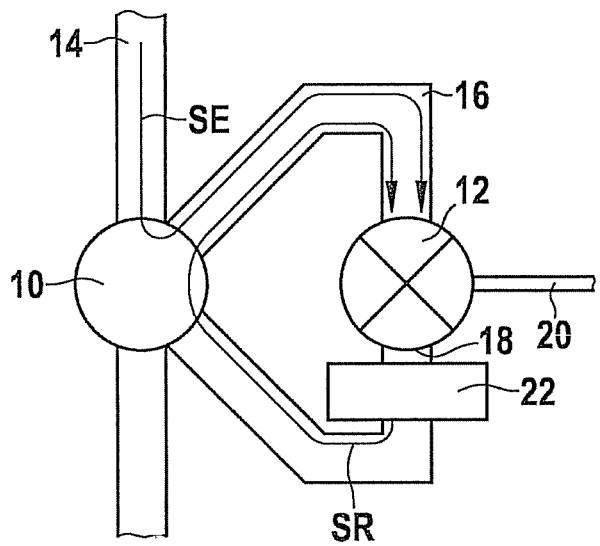
FIG. 3 shows a mixer module having an adjustable reflection point according to the present invention.

FIG. 3 now shows—again as a basic diagram—a mixer module in which the function impairment caused by interference signals is correctable subsequently after installation of the MMIC in the radar sensor.

For this purpose, an adjustable reflection point 22 using which the phase and amplitude of interference signal SR may be varied is provided at reference input 18 of mixer cell 12. The phase and amplitude are then adjusted in such a way as to yield destructive interference with the resultant of the other interference signals at HF input 16. The less important interference signals SIC and SIM have been omitted from FIG. 3 for the sake of simplicity.

Figure 4:
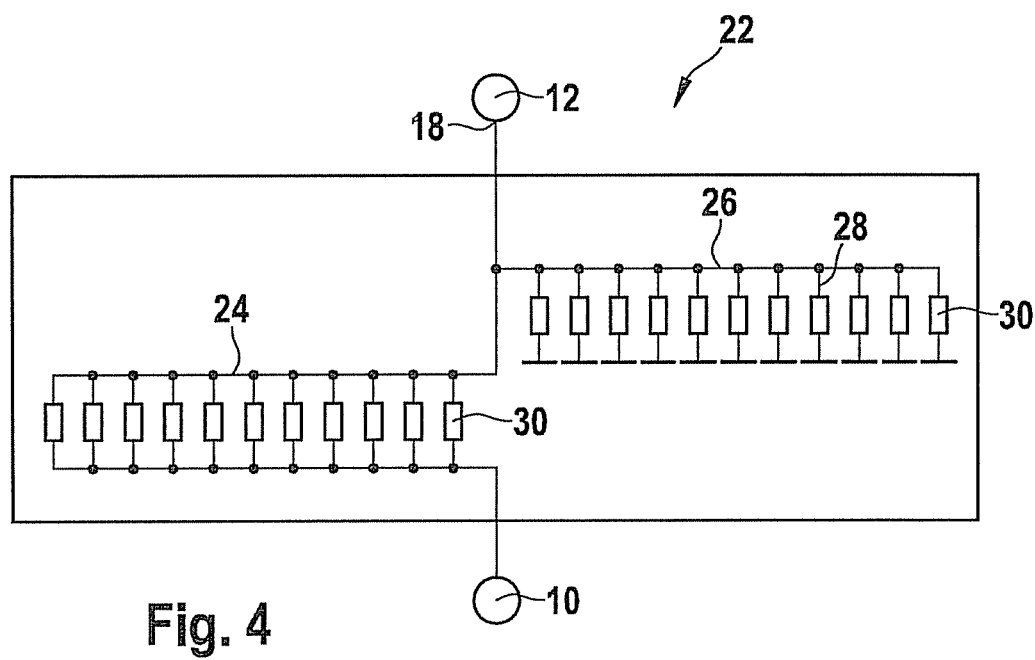
FIG. 4 shows a detailed diagram of the reflection point according to FIG. 3.

FIG. 4 shows a practical implementation of adjustable reflection point 22. According to this, this reflection point includes a plurality of parallel bypass lines 24, all of which connect coupler 10 to reference input 18 of mixer cell 12 but represent differently additional bypasses. Furthermore, reflection point 22 included a branch line 26 having a plurality of branches 28 connecting reference input 18 to ground via line segments of various lengths.

Each bypass line 24 and each branch 28 of branch line 26 contains an interruption point 30, for example, in the form of so-called laser fuses, which may be burned away with the aid of a laser after installation of the mixer module in the radar sensor, so that the corresponding line branch is interrupted.

The effective length of bypass line 24 or branch line 26 may thus be adjusted by opening one or more of interruption points 30. The effective length of bypass line 24 determines the phase of interference signal SR, while the effective length of branch line 26 influences the amplitude of this interference signal.

If transmission signal LO is fed into the radar sensor after installation of the mixer module in the radar sensor, and the performance of the mixer module, specifically the tendency to overdriving, is then analyzed (e.g., on the basis of the DC offset at IF output 20), the interference signal suppression may be optimized by opening interruption points 30 in bypass lines 24 and branch line 26 in succession. For example, first the interruption points 30 of bypass lines 24 are opened in succession so that the effective length of the bypass line gradually becomes larger (or smaller) and thus the phase of interference signal SR is gradually rotated. This procedure is continued until the overdriving reaches a minimum, i.e., until the phase of interference signal SR has shifted 180° with respect to the phase of the other interference signals, in particular interference signal SE.

Interruption points 30 in branch line 26 are next severed in order and thus the amplitude of interference signal SR is gradually increased (or reduced) until the amplitudes are compensated and thus a final optimum is achieved, i.e., complete destructive interference in the ideal case.

This principle is not limited to monostatic systems having transfer mixers but instead may also be used with bistatic systems, for example, with which there is crosstalk of the received signal with the transmitted signal. This is true for example with bistatic radar sensors having crosstalk from the transmitting antenna to the receiving antenna, in particular when the receiver is very sensitive due to the use of an LNA (low-noise amplifier) in the reception path and/or the mixer is designed to have only a very low high-signal resistance.

What is claimed is:

1. A radar sensor comprising:
    a mixer for mixing a received signal with a reference signal; and
    a device to compensate for interference signals which would overdrive the mixer, wherein the reference signal is fed to a reference input of the mixer via a coupler, and wherein the device to compensate has an adjustable reflection point at the reference input of the mixer for the reference signal.

2. The radar sensor as recited in claim 1, wherein the adjustable reflection point has an adjustable bypass line.

3. The radar sensor as recited in claim 2, wherein the adjustable bypass line has a plurality of parallel paths of different lengths, each having an interruption point which is to be opened during operation of the radar sensor.

4. The radar sensor as recited in claim 1, wherein the adjustable reflection point has an adjustable branch line connecting the reference input of the mixer to ground.

5. The radar sensor as recited in claim 4, wherein the branch line has a plurality of paths of different lengths, each having an interruption point to be opened during operation of the radar sensor.

6. The radar sensor as recited in claim 5, wherein the interruption point is a laser fuse.

7. The radar sensor as recited in claim 1, wherein the mixer is part of an MMIC.

8. The radar sensor as recited in claim 1, wherein the mixer is a transfer mixer.

9. The radar sensor as recited in claim 1, wherein the mixer is an active mixer.

10. The radar sensor as recited in claim 1, wherein the radar sensor has a monostatic design.

* * * * *